(12) United States Patent
Fujimoto et al.

(10) Patent No.: US 12,070,697 B2
(45) Date of Patent: Aug. 27, 2024

(54) GAME MEDIUM IDENTIFICATION SYSTEM, COMPUTER PROGRAM AND CONTROL METHOD THEREOF

(71) Applicant: Konami Digital Entertainment Co., Ltd., Tokyo (JP)

(72) Inventors: Yutaka Fujimoto, Tokyo (JP); Naoya Kihara, Tokyo (JP); Masafumi Okuta, Tokyo (JP); Takahiro Yoshida, Tokyo (JP); Michio Horikiri, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 904 days.

(21) Appl. No.: 17/008,743

(22) Filed: Sep. 1, 2020

(65) Prior Publication Data

US 2020/0391100 A1 Dec. 17, 2020

Related U.S. Application Data

(63) Continuation of application No. PCT/JP2019/009354, filed on Mar. 8, 2019.

(30) Foreign Application Priority Data

Mar. 15, 2018 (JP) ................................ 2018-047999

(51) Int. Cl.
*A63F 13/235* (2014.01)
*A63F 3/00* (2006.01)
(Continued)

(52) U.S. Cl.
CPC .......... *A63F 3/00643* (2013.01); *A63F 13/30* (2014.09); *A63F 2003/00665* (2013.01);
(Continued)

(58) Field of Classification Search
None
See application file for complete search history.

(56) References Cited

U.S. PATENT DOCUMENTS 11,344,795 B2 * 5/2022 Grimes .............. G06K 7/10297
2016/0287998 A1 * 10/2016 Kawanabe .............. A63F 13/20
(Continued)

FOREIGN PATENT DOCUMENTS

JP 2003-103045 A 4/2003
JP 2008-279046 A 11/2008
(Continued)

OTHER PUBLICATIONS

Office Action issued Mar. 31, 2022 in Korean Application No. 10-2020-7025048.
(Continued)

*Primary Examiner* — Sunit Pandya
(74) *Attorney, Agent, or Firm* — Sughrue Mion, PLLC

(57) ABSTRACT

A game medium identification system applied to a game in which each of physical game media, that includes an appearance element characterizing appearance, is used in combination with an additional thing, and identifying the game media, the game medium identification system includes: an information medium provided on the additional thing and holding identification information; a medium image identification device identifying the game medium based on an image of the game medium; an association setting device associating an identification result by the medium image identification device with an identification information of the information medium in accordance with correspondence relationship between one game medium and the additional thing to be used in the game in combination with the one game medium; and a medium identification device detecting the identification information from the information medium and identifying the game medium based on the identification
(Continued)

information and association set by the association setting device.

12 Claims, 12 Drawing Sheets

(51) Int. Cl.
A63F 13/30 (2014.01)
A63F 13/20 (2014.01)
A63F 13/213 (2014.01)
A63F 13/95 (2014.01)

(52) U.S. Cl.
CPC ............. *A63F 13/20* (2014.09); *A63F 13/213* (2014.09); *A63F 13/95* (2014.09); *A63F 2250/287* (2013.01)

(56) References Cited

U.S. PATENT DOCUMENTS

2017/0232335 A1* 8/2017 Williams ................ A63F 13/79 463/31
2018/0043259 A1* 2/2018 Wong ................... A63F 13/5255
2018/0256971 A1* 9/2018 Tsuda .................... G06F 3/0488
2021/0379483 A1* 12/2021 Fujimoto ............... G06V 20/00

FOREIGN PATENT DOCUMENTS

| JP | 2009-273626 A | 11/2009 |
| JP | WO2017/051782 A1 | 3/2017 |
| JP | 2017-188833 A | 10/2017 |
| JP | 2018-175635 A | 11/2018 |

OTHER PUBLICATIONS

International Search Report dated Apr. 9, 2019 in International Application No. PCT/JP2019/009354.
Written Opinion of the International Searching Authority dated Apr. 9, 2019 in International Application No. PCT/JP2019/009354.
Notification of Reasons for Refusal dated Sep. 26, 2018 from Japanese Patent Office in JP Application No. 2018-047999.
Japanese Office Action dated Sep. 27, 2023 in Application No. 201980017989.8.
Communication dated Mar. 7, 2024, issued in Chinese Application No. 201980017989.8.

* cited by examiner

FIG. 6

| CHIP ID | CARD ID | ORDINAL NUMBER |

GAME MEDIUM IDENTIFICATION SYSTEM, COMPUTER PROGRAM AND CONTROL METHOD THEREOF

BACKGROUND OF THE INVENTION

Field of the Invention

The present invention relates to a game medium identification system or the like that distinguishes a plurality of physical game media used in a game from each other and identifies the game media respectively.

Description of the Related Art

A system for shooting (or recording) a playing status of a game, and adding an effect to the obtained moving image (video) to provide a user with viewing it has been proposed (see, for example, Patent Literature 1). There is a known system in which a game medium used in a game, that uses physical game media, for example, a board game such as chess or shogi, or a card game that uses playing cards, trading cards or the like, is identified on the basis of a bar code provided on the game medium, information recorded on an IC chip disposed on the game medium, or information obtained through image recognition, and an image corresponding to the identification result is added to the playing image of the game to provide a user with viewing it (see, for example, Patent Literature 2). There is another known game system in which an image of an object is printed on a seal mount with an IC tag, and a seal of the image on the seal mount is affixed to an arbitrary card such that an ID recorded on the IC tag of the seal is utilized as card identification information to associate the ID of the IC tag with data of a user (see Patent Literature 3).

CITATION LIST

Patent Literature

Patent Literature 1: JP2017-188833A
Patent Literature 2: JP2003-103045A
Patent Literature 3: JP2009-273626A

SUMMARY OF THE INVENTION

When identifying a game medium from an image during play of a game, there is a possibility that the degree of illumination, the shooting environment such as the resolution of the equipment used for shooting, or the shooting conditions vary variously, and an image sufficient to identify the game medium with sufficient accuracy may not be obtained. If a technique that identifies the game medium using information of a barcode or an IC chip provided on or in the game medium is used, it is impossible to identify the game medium when such information is not provided on or in the game medium. For example, a following disadvantage may arise: a game medium issued before the identification technology is put into practical use naturally lacks such information, and it becomes difficult or impossible for the user to utilize the game medium acquired in the past if no changes are made to the game medium. If a technique that affixes a seal for identification to a game medium is used, it is necessary to secure a space or an area for affixing the seal to the game medium, and this may cause a disadvantage that a user feels resistance to directly affixing the seal to the game medium.

Accordingly, an object of the present invention is to provide a game medium identification system or the like for identifying a game medium using a technique different from the conventional techniques.

A game medium identification system according to one aspect of the present invention is a game medium identification system applied to a game in which each of a plurality of physical game media, that includes an appearance element characterizing appearance, is used in combination with a predetermined additional thing for each game medium, and distinguishing and identifying the plurality of game media from each other, the game medium identification system comprising: an information medium provided on the additional thing and capable of holding predetermined identification information; a medium image identification device identifying the game medium based on an image of the game medium captured by a predetermined image-capturing device: an association setting device associating an identification result by the medium image identification device with an identification information of the information medium in accordance with correspondence relationship between one game medium and the additional thing to be used in the game in combination with the one game medium; and a medium identification device detecting the identification information from the information medium of the additional thing which is combined with the game medium being used in the game through a predetermined information detection device and identifying the game medium based on the obtained identification information and association set by the association setting device.

A computer program for a game medium identification system according to another aspect of the present invention is a computer program for use with a game medium identification system applied to a game in which each of a plurality of physical game media, that includes an appearance element characterizing appearance, is used in combination with a predetermined additional thing for each game medium, and distinguishing and identifying the plurality of game media from each other, the computer program is configured to cause a computer of the game medium identification system to function as: a medium image identification device identifying the game medium based on an image of the game medium captured by a predetermined image-capturing device; an association setting device associating an identification result by the medium image identification device with an identification information held in an information medium provided on the additional thing in accordance with correspondence relationship between one game medium and the additional thing to be used in the game in combination with the one game medium; and a medium identification device detecting the identification information from the information medium of the additional thing which is combined with the game medium being used in the game through a predetermined information detection device and identifying the game medium based on the obtained identification information and association set by the association setting device.

A control method according to still another aspect of the present invention is a control method for use with a game medium identification system applied to a game in which each of a plurality of physical game media, that includes an appearance element characterizing appearance, is used in combination with a predetermined additional thing for each game medium, and distinguishing and identifying the plurality of game media from each other, the control method comprising: identifying the game medium based on an image of the game medium captured by a predetermined image-capturing device; setting association between an identification result of the game medium and identification information held in an information medium provided on the additional thing in accordance with correspondence relationship between one game medium and the additional thing to be used in the game in combination with the one game medium; detecting the identification information from the information medium of the additional thing which is combined with the game medium being used in the game through a predetermined information detection device; and identifying the game medium based on the obtained identification information and the set association.

BRIEF DESCRIPTION OF THE DRAWINGS

FIG. 6 is a diagram illustrating one example of a record recorded in association data of FIG. 4.

DESCRIPTION OF THE EMBODIMENTS

First Embodiment

Figure 1:
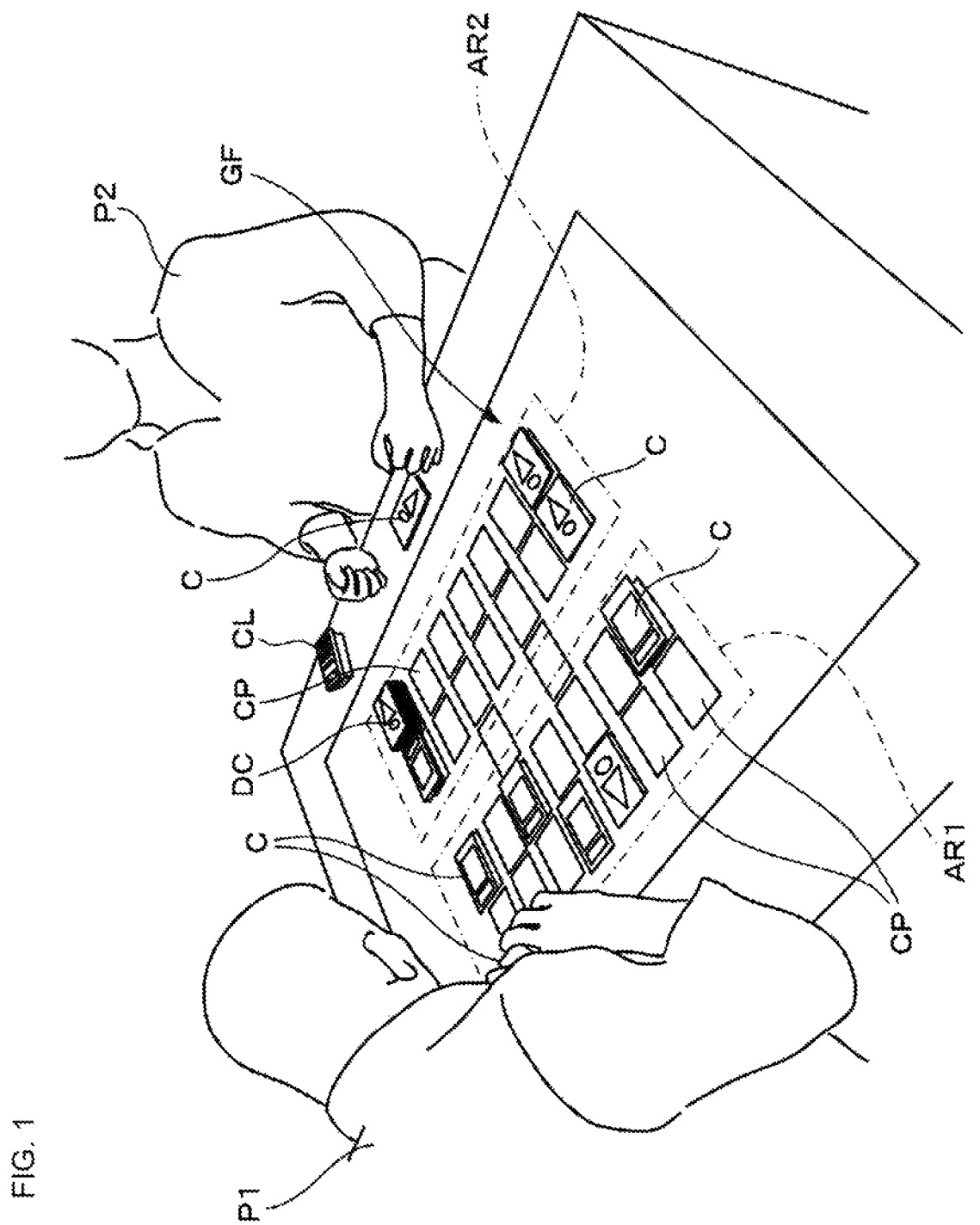
FIG. 1 shows one example of a situation in which a game to which a game medium identification system according to one embodiment of the present invention is applied is played.

A game medium identification system (hereinafter, sometimes abbreviated as an identification system) according to one embodiment of the present invention will now be described with reference to the drawings. Incidentally, in each of the drawings, when a plurality of elements, which are similar to each other, are depicted, a reference numeral may be assigned to one or some of such elements, as representatives of all the elements, in order to avoid the complication of the illustration. In the following description, the terms such as "first" and "second" may be used to distinguish elements from each other, but such terms are used for convenience of explanation and have no precedence or other significance.

Referring first to FIG. 1, a game will be described as an example to which the identification system of this embodiment is applied. The game shown in FIG. 1 is configured as a kind of card competition game in which two players P1 and P2 compete against each other using cards C as an example of physical game media. As is well known, in the card competition game, there are a plurality of types of cards C having different applications, roles, effects and the like in the game. A wide variety of cards are used, for example, cards used to attack opponent's cards, cards used to enhance or weaken the effects of attacks, and cards used to call special characters (sometimes the special characters are referred to as monsters, etc.) to produce specific or unique effects. The cards C are often appropriately loaded into a deck DC, which means a bundle of cards C, for use in a game. However, details of the type of the cards C may be appropriately decided according to the contents of the game, and therefore the details of the type of the cards C and the like will not be described in the following description. In FIG. 1, the details of the individual cards C are omitted, and each of the cards C is visually distinguished depending on whether the face of the card C in question is up or down.

The game proceeds by utilizing a game field GF as an example of a field where the players P1 and P2 should place the cards C. A plurality of card placing spots CP are set in the game field GF. Each card placing spot CP has generally the same shape and size as a single card C. The card placing spots CP are provided separately in a first area AR1 and a second area AR2 except for two card placing spots CP arranged at the center in the direction in which the players P1 and P2 face each other. The card placing spots CP in the first area AR1 are used by the player P1, and the card placing spots CP in the second area AR2 are used by the other player P2. Basically, one of the players P1 and P2 uses one of the two center card placing spots CP, and the other of the players P1 and P2 uses the other of the two center card placing spots CP. The card placing spots CP in each of the areas AR1 and AR2 are further divided into a plurality of zones (not shown) depending on applications, roles and the like of the card placing spots in the game. For example, the card placing spots CP on the near-to-the-player side of the right end when viewed from each player P1, P2 is set as a zone in which a plurality of cards C constituting the deck DC are superimposed with the card faces down, and the card placing spots CP on the far-from-the-player side of the right end is set as a zone in which the cards C that have been used in the game or become unusable due to an attack from the other player are superimposed with the card faces up. The number of the card placing spots CP and the classification of the zones may be appropriately decided according to the rules of the game or the like, and a detailed description thereof will be omitted.

Each of the players P1 and P2 prepares the deck DC, which will be used in the game, from a large number of cards owned by the player concerned, and the game proceeds as each player places the cards C included in the deck DC in the card placing spots CP appropriately. In the game, a player's movement different from the operation of placing the cards C in the game field OF is also performed, e.g., the players P1 and P2 hold some of the cards C as hands or place the cards C at an appropriate position outside the game field OF. For example, FIG. 1 shows a situation in which the player P1 holds some of the cards C as the hands, and the player P2 turns the hands over (card faces down) and places the hands in front of the player P2. Further, in the game, an external device such as a calculator CL for calculating a numerical value that affects the progress of the game, such as the effect of the attack or a score, is sometimes used.

Figure 2:
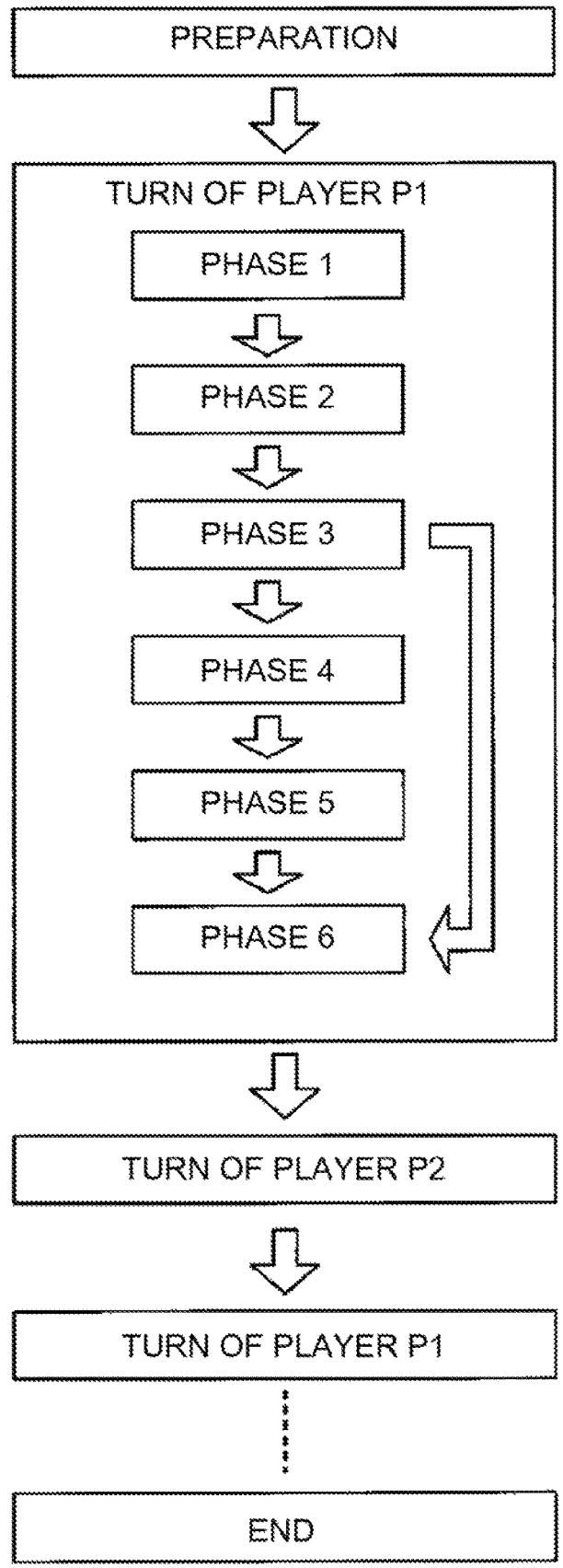
FIG. 2 is a diagram illustrating one example of the progress procedure of the game shown in FIG. 1.

FIG. 2 shows an example of the progress in the game. The game shown by FIG. 1 proceeds in a so-called turn system in which the operation of turn is alternately repeated between the players P1 and P2. First, as a preparation of the game, for example, an operation is performed in which the deck DC of each of the players P1 and P2 is shuffled and placed in the card placing spot CP on the near-to-the-player side of the right end, and a predetermined number of cards C are picked up from the deck DC of the player P1, P2 to hold the cards as the hands. When the preparation is completed, the game starts from the turn of the player who attacks first (for example, the player P attacks first). One turn is divided into a plurality of phases. A plurality of phases is a concept for classifying the procedure to be done in a single turn into a plurality of stages according to the content and nature of the procedure. In the example of FIG. 2, one turn is divided into six stages, i.e., from a phase 1 to a phase 6, but this is just an example.

In each phase, the player P1 (or P2) who is given the turn may select an appropriate behavior within a range determined for the phase concerned. An example is as follows. In the phase 1, a card C is picked up from the deck DC, and in the phase 2, the effect of the card C, which is designated as the effect to be performed an effect processing in the phase 2, can be activated. In the phase 3, while using the cards C as appropriate, various behaviors such as calling (summoning) a virtual character such as a monster to be used in a battle, setting a card C having a specific effect such as magic or trap, or activating the effect of the card C are allowed. In the phase 4, fighting (battle) using the cards C is performed. For example, fighting is performed by selecting a card C used by the player P1 (or P2) of its own turn for the attack and another card C of the other player P2 (or P1) as the attack target. Instead of or in addition to the card C, the opponent player itself can be the attack target. The outcome of the fighting depends on the parameters such as the attribute and strength of the card C in use. In the phase 5, the same behaviors as in the phase 3 are allowed. In the phase 6, the end of the turn is declared. Incidentally, the battle of the phase 4 can be avoided by the selection made by the player P1 (or P2) to which the turn is given. In that case, the phases 4 and 5 are skipped. The end of one phase may be indicated explicitly by operation of the card C. or may be indicated by an action different from the card operation of the player P1, P2, for example, a gesture or other physical movement, or predetermined utterance of the player P1, P2. When one turn is finished, the turn shifts to the other player P2 (or P1). The game ends as the turns are alternately repeated and the predetermined ending condition is satisfied. The ending condition is satisfied, for example, when the value of a parameter such as the life set for the player P1, P2 decreases to a predetermined value (e.g., 0) by the battle.

In a game such as the above-described game, the progress of the play may be recorded for a certain purpose. For example, the progress of a game may be recorded for the purpose of distributing the game being played to a third party, or analyzing the progress of the game, the tendency of the play or the like. When recording the progress of the game, it may be necessary to acquire information for determining how the card C was used, such as what card C was placed at what timing in which position of the game field GF. To acquire such kind of information, it may be necessary to identify the card C in the game field GF. The identification system of this embodiment can be applied to such applications.

Figure 3:
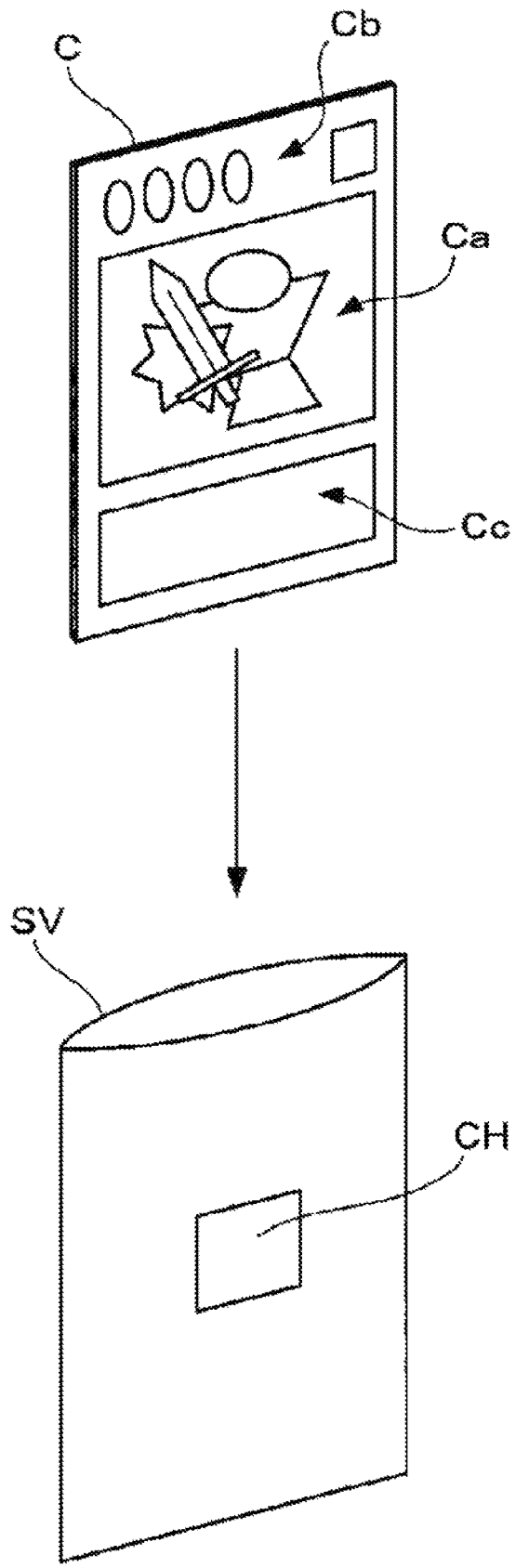
FIG. 3 is a diagram illustrating one example of a combination of a card and a sleeve.

An embodiment of the identification system will now be described with reference to FIG. 3 to FIG. 8. Incidentally, in the following description, the players P1 and P2 illustrated in FIG. 1 may be represented by the reference numeral PL as the player PL. The identification system of this embodiment utilizes an additional thing added to the card C and used in the game for the identification of the card C. FIG. 3 shows the relationship between the card C and a sleeve SV as an example of the additional thing. On the face of the card C, an image portion Ca, an information portion Cb and another information portion Cc are provided. In the image portion Ca, displayed are an image of a character, an item, an object or the like to be symbolized by the card C (hereinafter sometimes referred to as the character or the like) or an image symbolizing the effect of the card C. In the information portion Cb, information about a name of the character or the like displayed on the image portion Ca or the effect of the card C, or information about attributes or the like of the character are displayed using letters, symbols or the like. In the information portion Cc, a description of the card C, or the degree of the effect of the card or the strength/weakness of the character or the like is displayed using letters, symbols or the like. Various images, letters, symbols and the like shown in the image portion Ca and the information portion Cc function as an example of an appearance element that characterizes the appearance of the card C. Incidentally, the appearance element for identifying the card C may be, for example, only the image of the image portion Ca, or may include, in addition to the image of the image portion Ca, a name or the like in the information portion Cb. The background, color or the like of the card C may be further used as part of the appearance element for identifying the card C. Incidentally, a common appearance is attached to back surfaces of all the cards C in order to make it impossible to distinguish the cards from each other when the cards C are placed their faces down.

The sleeve SV is used for the purpose of protection or the like of the card C. In order to be able to observe the appearance element of the card C, the sleeve SV is formed of a film material or the like so that at least one surface of the sleeve is transparent. The sleeve SV is a bag-shaped with three sides bound and one side open. The card C is received in the sleeve SV through the opening of the sleeve. This kind of sleeve SV is used for the purpose of preventing damage, etc. caused by scratching of card C during play of the game. Of course, the sleeve SV may also be used during storage or transportation of the card C. An IC chip CH as an example of an information medium in which the identification information to be used to identify the card C is recorded is attached to the sleeve SV. The IC chip CH is added to the sleeve SV in the manufacturing process of the sleeve SV and offered to the market. The IC chip CH is configured, for example, as an RFID tag. The IC chip CH has a chip ID as an example of unique individual identification information for each IC chip CH. One IC chip CH is provided for each sleeve SV. Therefore, the chip ID of the IC chip CH also functions as unique identification information for each sleeve SV. Incidentally, the card C is formed using a paper medium. Therefore, when the card C is received in the sleeve SV, it is possible to read the chip ID of the IC chip CH from either the face or the back surface of the card C, even if the IC chip CH is disposed on either the face or the back surface of the card C. Incidentally, if the face of the card C is not to be hidden by the IC chip CH, the card C may be received in the sleeve SV such that the surface to which the IC chip CH of the sleeve SV is attached is located on the back surface of the card C.

As described above, the sleeve SV is configured such that at least one surface of the sleeve is transparent. In one aspect thereof, one surface of the sleeve SV may be transparent and the opposite surface may be opaque, or both the surfaces of the sleeve SV may be transparent. If one surface of the sleeve SV is transparent and the opposite surface is opaque, the card C is received in the sleeve SV such that the face of the card coincides with the transparent surface of the sleeve SV. In this case, if the IC chip CH is attached to the inside of the opaque surface of the sleeve SV, a significantly advantageous effect is obtained. That is, when the IC chip CH is mounted onto the inside of the opaque surface of the sleeve SV, the IC chip CH is hidden by the back surface of the card C, and therefore there is no risk that the visibility of the face of the card C is reduced by the IC chip CH. Further, even if the back surface of the card C is looked at, it is impossible to visually recognize the IC chip CH through the sleeve SV. Therefore, even if there is an error in the mounting position of the IC chip CH, for example, or there is an individual difference in the IC chip CH itself, the possibility that the card C is identified from the back surface by using the difference as a clue is eliminated. Incidentally, when both the surfaces of the sleeve SV are transparent, it is possible to selectively position the IC chip CH on either the face or back surface of the card C. In that case, if the visibility of the card C is emphasized, the IC chip CH may be positioned on the back surface of the card C, or if exclusion of specifying from the back surface side of the card C is emphasized, the IC chip CH may be positioned on the face side of the card C.

If the IC chip CH is attached to apart of the sleeve SV and the thickness of the sleeve SV increases only at the chip attaching part, then there is a possibility that the stability is impaired as the cards C are stacked. If such a problem occurs, a protrusion having a height equivalent to the IC chip CH may be provided at an appropriate position of the card C, for example, on the outer edge of the card or the like. The protrusion may be formed in a suitable shape such as a frame shape which circumferentially extends round the card C, a multi-shaft shape whose shafts protrude independently from the four corners or the like of the card C, or a wall shape which extends an appropriate length. Alternatively, in place of or in addition to the above-described protrusion, the thickness of the card C itself may be thinner at the attaching part of the IC chip CH and thicker at other parts.

Figure 4:
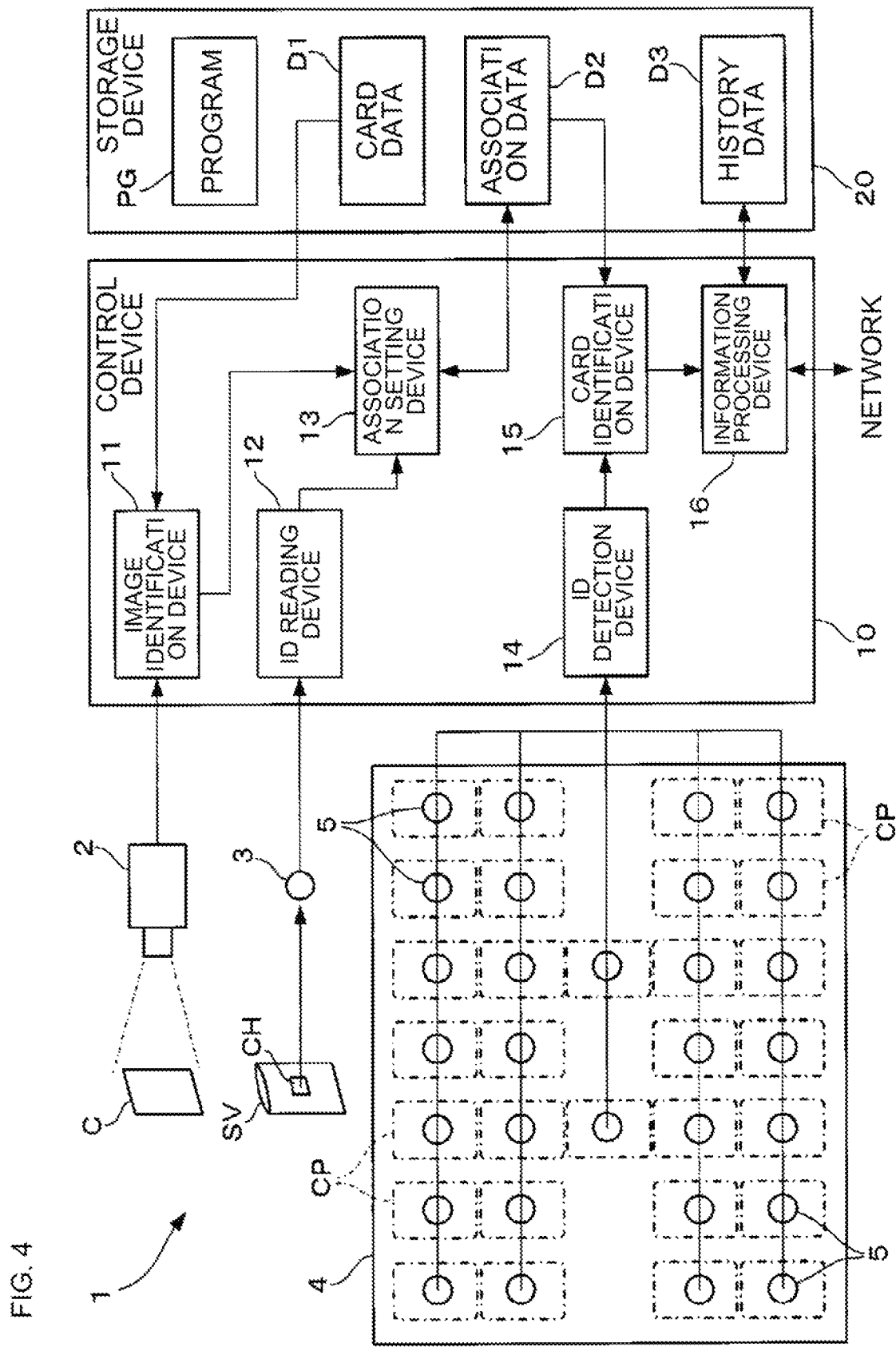
FIG. 4 is a diagram illustrating one example of an overall configuration of a game medium identification system according to a first embodiment.

FIG. 4 shows an example of the configuration of the identification system 1. The identification system 1 includes a camera 2 as an example of an image-capturing device capturing the card C, a first reader 3 as an example of an information reading device reading the chip ID from the IC chip CH of the sleeve SV, and a game board 4. The camera 2 captures an image of the card C, converts the obtained optical image into an electronic image signal by a solid-state image pickup device, and outputs the electronic image signal. The camera 2 and the first reader 3 are provided as an example of a device obtaining information necessary for identifying the card C during play of the game from the card C and the sleeve SV, respectively, prior to play of the game. Therefore, it is only required that the camera 2 be provided so as to be able to capture at least one card C. Also, it is only required that the first reader 3 be provided so as to be able to read the chip ID from the IC chip CH of at least one sleeve SV.

The game board 4 provides the game field GF shown in FIG. 1. The game board 4 may be configured as an example of a portable mat-like or plate-like placed object that can be carried in and out with respect to the upper surface of the table used to play a game, or may be integrally provided as a part of the table by being fixed to the upper surface of the table. Incidentally, when the game board 4 has portability, there is an advantage that by bringing the game board 4 to an appropriate place where the game is played, and the identification system 1 can be constructed at that place. The above-described card placing spots CP are shown on the upper surface of the game board 4. The card placing spots CP are clearly indicated using printing or other display methods. The game board 4 is provided with a plurality of second readers 5 for detecting the chip ID of the sleeve SV that has received the card C placed on the game field GF. The second readers 5 function as an example of an information detection device detecting the chip ID from the sleeve SV that is combined with the card C placed on the game field GF during play of the game, and each of the second readers 5 also functions as an example of a detection device that functions as an information detection device thereof. The second readers 5 are disposed in a matrix on the game board 4 such that the second readers correspond to at least the card placing spots CP in a one-to-one manner. Considering a case where the card C is placed in a position deviated from the card placing spot CP, a greater number of second readers 5 may be provided than the number of the card placing spots CP. For example, the second readers 5 may be disposed vertically and horizontally in a matrix at intervals sufficiently less than the alignment spacing of the card placing spots CP.

The camera 2 and the first reader 3 need not necessarily be provided on the game board 4 itself if the game board 4 is installed. For example, if the identification system 1 is used for events such as a competition, the camera 2 and the first reader 3 may be disposed at a location (or locations) different from the place where the game board 4 is put. For example, the camera 2 and the first reader 3 may be installed in a management site which is set up by a sponsor, an operator or the like of the event and whose location is different from the place where the game is held. Incidentally, if the camera is installed at a location that enables the shooting of the entire game field GF or the game field GF and the players PL facing each other across the game field in order to record the state in which the game is played, the camera can also be used as the camera 2 of FIG. 4. It is also possible to use at least one of the second readers 5 of the game board 4 as the first reader 3.

The identification system 1 further includes a control device 10 and a storage device 20. The control device 10 is configured as an example of a computer including a CPU and a peripheral device such as an internal memory necessary for its operation. To the controller 10, connected are the above-described camera 2, the readers 3 and 5 and the storage device 20. Input device and/or output device, such as keyboards, pointing devices, monitors and speakers, may be appropriately connected to the controller 10, but their illustrations are omitted. The storage device 20 is a storage device using a non-volatile storage medium such as a magnetic disk or a flash memory, and functions as an external storage device for the CPU of the control device 10. A predetermined computer program PG is recorded in the storage device 20. The control device 10 includes an image identification device 11, an ID reading device 12, an association setting device 13, an ID detection device 14, a card identification device 15, and an information processing device 16 as a logical device realized by a combination of hardware resources of the control device 10 and a computer program PG as an example of software resources.

Figure 5:
FIG. 5 is a diagram illustrating one example of a record recorded in a card data of FIG. 4.

The image identification device 11 analyzes an image of the card C captured by the camera 2, and collates the analysis result with a card data D1 recorded in the storage device 20 to identify the card C. As shown in FIG. 5 as an example, a record in which the card ID of the card C and the characteristics information are recorded in association with each other is accumulated in the card data D1. The card ID is an example of medium identification information uniquely set for each type of the card C. The characteristics information is information describing the appearance characteristics on the face of the card C. The appearance of the face of the card C differs for each type of the card C due to the above-described appearance elements. Therefore, it is possible to specify the type of the card C based on the image, and the characteristics information is generated in advance as information describing the characteristics of the appearance element. If the image captured by the camera 2 is analyzed being able to be compared with the characteristics information, the card ID corresponding to the type of the card C can be identified from the image of the card C. Incidentally, information about the specific contents of the card C, such as the name, the attribute, the strength, and the effect of the character and the like, is recorded in advance in the data (not shown) in association with the card ID, and if the card ID is found, the specific contents of the card C can be determined using the card ID as a clue. Therefore, the identification of the card C in this embodiment is achieved by identifying at least the card ID. If the card ID matches, the characteristics of the appearance elements of the card C match. In the game, a plurality of cards C having a matching card ID may be incorporated into a single deck DC, and the cards C may be appropriately used.

Referring back to FIG. 4, the ID reading device 12 reads the chip ID recorded in the IC chip CH of the sleeve SV, to which the reading operation of the first reader 3 is performed, based on the output signal of the first reader 3. The association setting device 13 records the identification results of the image identification device 11 and the ID reading device 12 in the association data D2 of the storage device 20 such that the identification results of the image identification device 11 and the ID reading device 12 are associated with each other. As an example, as illustrated in FIG. 6, a record in which the card ID identified by the image identification device 11 and the chip ID identified by the ID reading device 12 are recorded in association with each other is stored in the association data D2 as an example of the association information. The association data D2 is created such that at least the relationship with the deck DC used in the game can be determined. For example, a unique data number is set for each deck DC to be read, from which the card ID and the chip ID are read using the camera 2 and the first reader 3, and the association data D2 is created in association with the data number. The distinction of the deck DC can be realized, for example, by directing the controller 10 to start and end the processing when associating the card ID of the card C included in a single deck DC with the chip ID of the sleeve SV. Such directions to the controller may be provided, for example, via the camera 2 or the first reader 3, or may be manually entered by an operator or the like of the controller 10 using an input device, such as a keyboard, connected to the controller 10. Distinction of the deck DC in the association data D2 can be realized by a technique such as adding a deck number to each record of the association data D2. Incidentally, the association data D2 may be created in association with the identification information of the player PL, for example, so that the correspondence relationship with the player PL can be determined. In that case, when the contents of the deck DC used by the same player PL are changed, the association data D2 associated with the player PL needs to be updated according to the contents of the deck DC after the change. FIG. 4 only shows the association data D2 corresponding to a single deck DC.

The chip ID is unique identification information for each IC chip CH of the sleeve SV, and the card ID is unique identification information for each type of card C. Therefore, the card ID corresponding to the card C and the chip ID of the IC chip CH of the sleeve SV which receives the card C therein are recorded in association with each other, so that it is possible to identify the card ID of the card C received in the sleeve SV using the chip ID of each sleeve SV as a clue. Further, ordinal information is recorded in the association data D2 in association with the chip ID and the card ID. The ordinal number is, for example, information that is added to distinguish and identify a plurality of cards C of the same type, that is, when a plurality of cards C as an example of a plurality of common appearance media having the common appearance elements are identified by the image identification device 11, the cards C are distinguished from each other and identified, such as a card C identified at the first time and a card C identified at the second time. Incidentally, as in a modification described later, when it is not necessary to identify the number of cards C of the same type, the ordinal information may be omitted, and in this case, processing to identify the correspondence relationship between the record recorded in the association data D2 and the deck DC or the player PL is unnecessary.

Referring back to FIG. 4, the ID detection device 14 detects the chip ID of the sleeve SV combined with each card C placed in the game field GF based on the output signals of the respective second readers 5 mounted on the game board 4. The ID detection device 14 is designed to distinguish the positions of the second readers 5 mounted on the game board 4 from each other and identify the positions. For example, the ID detection device 14 distinguishes the output signals of the second readers 5 from each other by unique reader numbers given to the respective second readers 5 and identifies the output signals of the second readers. Thus, the ID detection device 14 can identify the chip ID of the sleeve SV in association with the position in the game field GF. In other words, the ID detection device 14 can perform not only the detection of the chip ID of the sleeve SV placed in the game field GF but the identification of the position where the sleeve SV is placed in the game field GF. The card identification device 15 identifies the card ID corresponding to the chip ID read by the ID detection device 14 based on the association data D2, and outputs the obtained card ID to the information processing device 16 in association with the detected position of the chip ID.

Based on the identification result of the card identification device 15, the information processing device 16 repeatedly generates, at an appropriate cycle, card location information indicating the locations of the cards C in the game field GF during play of the game, that is, which card C having the card ID was placed in what position on the game field GF, and records the obtained information as necessary while adding the detection time to the history data D3 held in the storage device 20. Also, the information processing device 16 appropriately reads the card location information recorded in the history data D3 and sends the card location information to a server (not shown) via a predetermined network. The server performs appropriate processing based on the obtained card location information. For example, the server may reproduce the progress status of the play of the game based on the card location information included in the history data D3, analyze the progress status, or distribute the progress status through the network. It is possible to determine what type of card C is placed in what position at what timing during the play of the game based on the historical data D3, and the historical data D3 may be utilized for various applications, in addition to the analysis of the progress status and the distribution of the progress status of the game via the network.

Next, an example of processing performed by the control device 10 of the identification system 1 in relation to the identification of the card C will be described. In the identification system 1, the processing for registration of the card C and the processing for identification of the card C are executed, so that the cards C placed in the game field GF are sequentially identified during the play of the game. The former processing is the processing which is carried out before the game is played, and the latter processing is the processing which is carried out during the play of the game.

Figure 7:
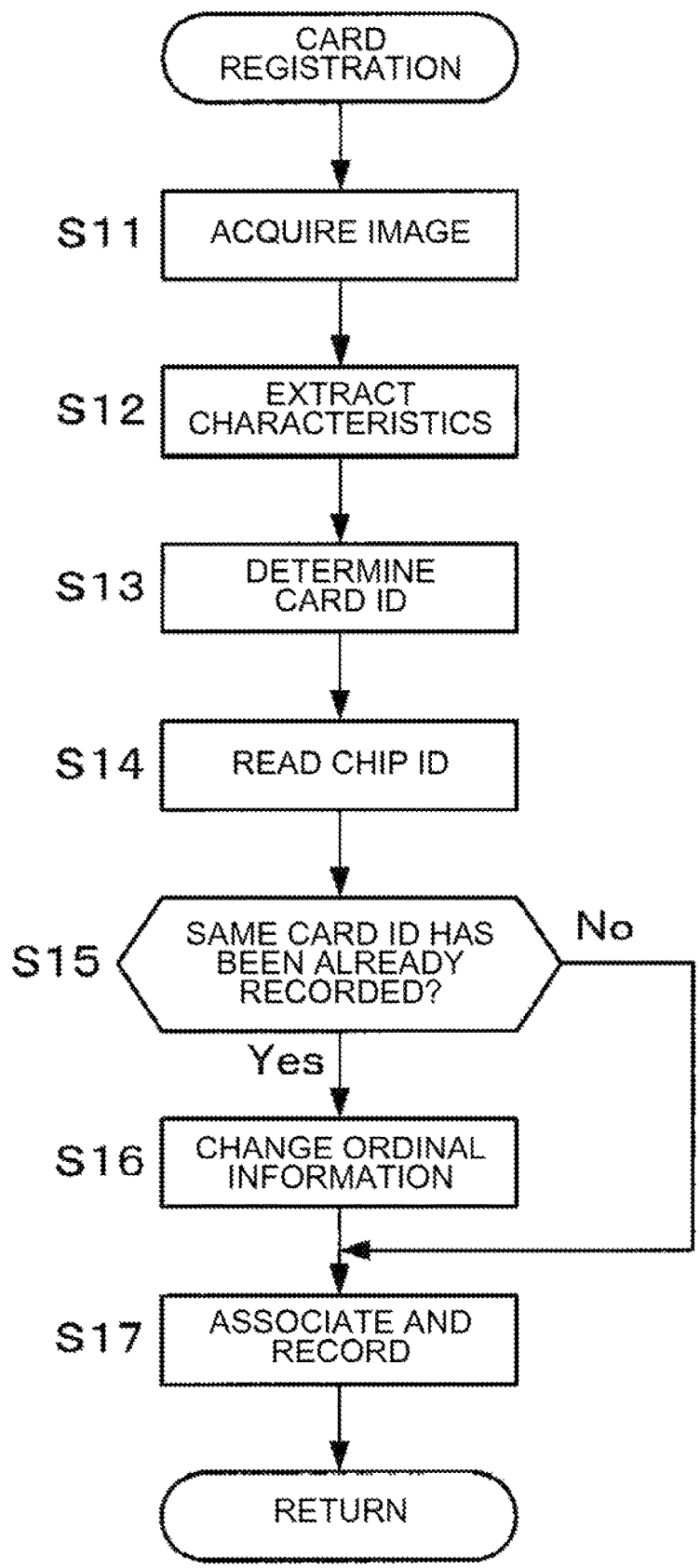
FIG. 7 is a flowchart illustrating one example of a procedure of a card registration process performed by a control device of FIG. 4.

FIG. 7 shows an example of the procedure of the processing for registration of the card C. In the card registration processing illustrated in FIG. 7, a reading operation in which the face of the card C included in the deck DC configured to be used by each player PL in the game is held up to the camera 2 and the sleeve SV to be used in combination with the card C is held up to the first reader 3 is sequentially performed for all the cards C and the sleeve SV. Incidentally, when holding up the sleeve SV to the first reader 3, the card C may have been received in the sleeve SV in advance or the card C may be not received in the sleeve SV. Incidentally, when an operation such as sealing the sleeve SV in which the card C is received is performed for use in the game, it is advantageous that the reading operation of the chip ID be performed after the sealing, in order to prevent the change of the combination of the sleeve SV and the card C.

The controller 10 repeatedly executes the processing of FIG. 7 each time a reading operation is performed on the card C and the sleeve SV. Incidentally, if the association data D2 is created, for example, in units of deck DC or player PL, the above-described reading operation is separately performed for each unit to which the association data D2 is to be created. Information indicating the end of the reading operation is given to the control device 10 via an appropriate input device each time the reading operation of the range in which the association data D2 is to be created is completed, but details thereof is omitted.

As the processing for registration of FIG. 7 starts, the image identification device 11 of the control device 10 acquires the image of the card C from the camera 2 (Step S11), and analyzes the obtained image to extract the characteristics information of the appearance of the card C (Step S2). Subsequently, the image identification device 11 extracts a record having the characteristics information that matches or is closest to the extracted characteristics information from the card data D1, and determines that the card ID of the record is the card 1D of the card C captured by the camera 2 (Step S13). The card ID determined by the image identification device 11 is provided to the association setting device 13. Following the determination of the card ID, the ID reading device 12 reads the chip ID of the sleeve SV through the first reader 3 and provides the chip ID to the association setting device 13. Incidentally, although the chip ID is read after Step S13 in FIG. 7, the reading of the chip ID of the sleeve SV may be performed in conjunction with or prior to the shooting of the card C by the camera 2. In other words, the processing of Step S11 to Step S13 and the processing of Step S14 may be executed in parallel, or the processing of Step S14 may be performed first and then the processing of Step S11 to Step S13 may be performed.

When the determination of the card ID and the reading of the chip ID are completed, the association setting device 13 determines whether or not a record including the same card ID as the card D provided from the image identification device 11 is already recorded in the association data D2 (Step S15). If a record including the same card ID is already recorded, the association setting device 13 changes the ordinal information of the record to be generated corresponding to the card C captured this time by the camera 2 to the value obtained by adding 1 to the number of records of the same card ID already recorded in the association data D2 (Step S16). For example, if there are already two records with the same card ID, the ordinal information is changed to 3. When the determination of Step S15 is negative, that is, when it is determined that the record including the same card ID does not exist in the association data D2, the ordinal information is maintained at the initial value of 1.

When the ordinal information is changed in Step S16 or the determination of Step S15 is negative, the association setting device 13 generates a record in which the card ID determined in Step S13 and the chip ID determined in Step S14 are correlated with each other, and records the generated record in the association data D2 (Step S17). Incidentally, the ordinal information which is changed in Step S16 or maintained at the initial value in Step S15 is added to the record recorded in Step S17. Thus, the processing for card registration corresponding to a set of the card C and the sleeve SV is completed. Then, the processing of FIG. 7 is repeated until the recording to the association data D2 is completed for all the combinations of the cards C included in the single deck DC and the sleeves SV receiving the cards therein, thereby completing the association data D2 corresponding to the single deck DC or a single player PL.

Figure 8:
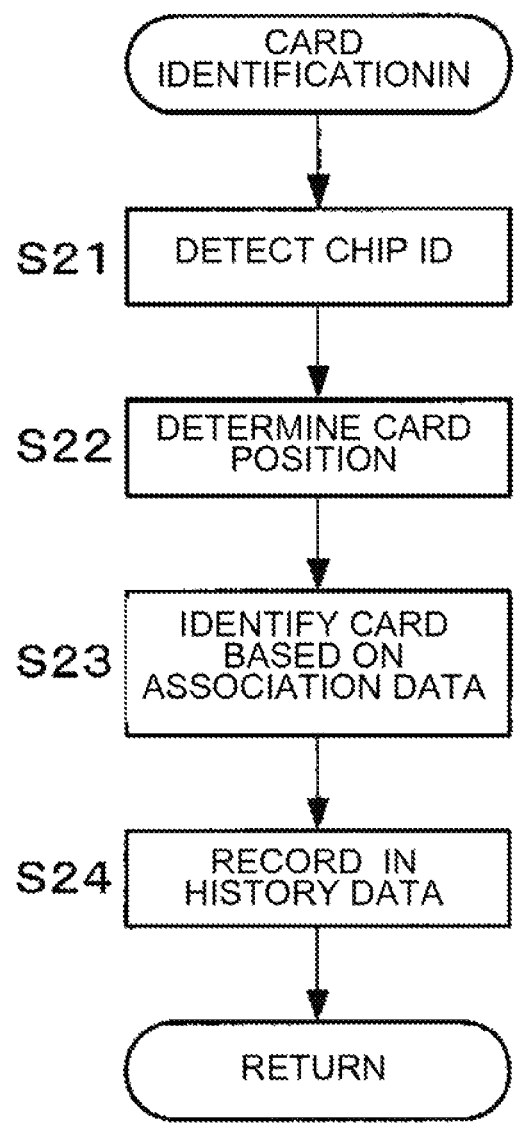
FIG. 8 is a flowchart illustrating one example of a procedure of a card identification process performed by the control device of FIG. 4.

Next, an example of a procedure of processing for card identification in the game will be described with reference to FIG. 8. The processing of FIG. 8 is processing that is repeatedly executed at a predetermined cycle during the play of the game. It is assumed that before the processing of FIG. 8 starts, the association data D2 corresponding to the decks DC used by the players PL competing against each other in the game is identified, and the correspondence relationship between the first area AR1 and the second area AR2 (see FIG. 1) in the game field GF and the association data D2 is also identified in advance. The identification may be performed, for example, by a player PL or an operator as a third party, for example, who specifies the distinction between the association data D2 and the first area AR1 or the second area AR2 for the control device 10 prior to starting the play of the game. Alternatively, if the association data D2 is created in association with the identification information of the player PL, the identification information of the player and the information that distinguishes the areas AR1 and AR2 may be provided to the control device 10 prior to starting the play of the game.

In the processing of FIG. 8, the ID detection device 14 of the control device 10 sequentially reads the output signals of the respective second readers 5 provided on the game board 4 and acquires the detection status of the chip ID by the second readers 5 (Step S21). Next, based on the detection result of Step S21, the ID detection device 14 determines the position where the card C is placed (Step S22). When the card placing spots CP and the second readers 5 are associated with each other in a one-to-one manner, the position of the card placing spot CP corresponding to the reader 5 which has detected the chip ID may be determined as the position of the card C. If a plurality of readers 5 detect the same chip ID because the number of readers 5 is greater than the number of card placing spots CP and the card C is placed across the detection ranges of a plurality of readers 5, following processing may be performed: the detection range of the chip ID is specified using the positions of the readers 5 as a clue, and the position of the center of gravity of the detection range is determined as the position where the card C is placed, or the position of the card C is estimated based on the strength of the detection signal of each reader 5.

The chip ID detected in Step S21 and the position of the card C determined in Step S22 are provided to the card identification device 15. The card identification device 15 identifies the card ID corresponding to the provided chip ID based on the association data D2 (Step S23). Thus, what type of card C is placed in the game field GF at the timing of executing the processing of FIG. 8 is identified in association with the position of the card in question. The chip 1D recorded on the IC chip CH of the sleeve SV can be read by each of the second readers 5 whether the face of the card C is up or down. Therefore, it is possible to identify the card ID of the card C regardless of the face of the card C being up or down in the game field GF. Incidentally, in Step S23, the association data D2 used for determination may be selected depending on whether the position of the card C belongs to the area AR1 or the area AR2. That is, with respect to the chip ID detected in the first area AR1, the association data D2 corresponding to the deck DC of the player PL using the first area AR1 is referred to, and with respect to the chip ID detected in the second area AR2, the association data D2 corresponding to the deck DC of the player PL using the second area AR2 is referred to. With respect to the chip ID detected in the central area between the areas AR1 and AR2, the association data D2 corresponding to the deck DC of either player may be referred to in accordance with the usage rules of the card placing spot(s) CP.

The card identification device 15 provides the identification result of Step S15 to the information processing device 16. The information processing device 16 generates card location information indicating the position and type of the card C on the game field GF at the execution time of the processing of FIG. 8 according to the provided identification result, and records the information in the history data D3 (Step S24). Thus, the processing of FIG. 8 of this time is completed. Thereafter, the processing of FIG. 8 is appropriately repeated until the play of the game ends, so that the situation in which the cards C are placed in the game field GF is sequentially recorded in the history data D3.

According to the above-described embodiment, a unique chip ID is recorded in advance in the sleeve SV as an example of the additional thing that is added to the card C and used for the game, and the correspondence relationship between the chip ID and the card ID of the card C is identified in advance by the processing of FIG. 7 and recorded in the association data D2. During the play of the game, the card ID and the position of the card C are specified by using the chip ID as a clue by the processing of FIG. 8, and are recorded in the history data D3. Therefore, the card C can be stably identified without being influenced by the environment in which the game is played, as compared with the case in which the type and the position of the card C are determined from the image obtained during the play of the game. While the type of the card C is specified based on the image of the card C, the chip ID recorded on the IC chip CH of the sleeve SV is used for identifying the card ID and the position of the card C placed in the game field GF, and therefore it is not necessary to record the identification information such as a bar code or an IC chip on the card C itself. Thus, even an old card C to which the identification technology of card C is not yet applied can be identified. Further, since it is not necessary to affix an information medium such as an IC chip to the card C, it is not necessary to secure a space for affixing the information medium to the card C. Inconveniences such as the appearance of the card C being impaired by affixing or a certain amount of time and efforts being required for the affixing would not occur. If processing such as affixing a seal having an IC chip onto the back surface of the card C, for example, is performed, an inconvenience would occur: it may be possible to identify the card C from the back surface of the card depending on the manner of the affixing such as the location of the seal and/or the orientation of the seal. In contrast, the IC chip CH of the sleeve SV can be mounted uniformly during the manufacture of the sleeve SV. Thus, there is no risk of inconvenience that the manner of mounting the IC chip CH to the sleeve SV allows the identification of the card C.

In the above-described embodiment, it is assumed that the combination of the card C and the sleeve SV, when the card registration processing of FIG. 7 is performed, is maintained as it is even in the game. When the correspondence relationship between the card C and the sleeve SV is changed, the correspondence relationship between the card ID and the chip ID recorded in the association data D2 and the combination of the actual card C and the sleeve SV do not match. However, in events such as a competition, after the card C is once put in the sleeve SV, the rule, such that the act of extracting the card C from the sleeve SV is prohibited until the game ends, is often applied. Even the sleeves SV are distributed from a sponsor of the event and strict rules such as encasing the cards C in the sleeves SV under the supervision of the sponsor to seal until the end of the game are applied. If it becomes necessary to change the card C or the sleeve SV, the correspondence relationship between the card ID and the chip ID is set again prior to the play of the game so that it is possible to update the correspondence relationship recorded in the association data D2 to relationship that matches the actual condition at the time of play of the game. Therefore, even if the chip ID of the sleeve SV is used as a clue to identify the card ID, there is substantially no problem.

In the above-described embodiment, the image identification device 11 of the control device 10 functions as an example of the medium image identification device by executing the processing of Step S11 to Step S13 in FIG. 7, the ID reading device 12 executes the processing of Step S14 in FIG. 7, the association setting device 13 functions as an example of the association setting device by executing the processing of Step S15 to Step S17 in FIG. 7, the ID detection device 14 of the control device 10 executes the processing of Step S21 and Step S22 in FIG. 8, and the card identification device 15 functions as an example of the medium identification device by executing the processing of Step S23 in FIG. 8.

Second Embodiment

Next, referring to FIG. 9 to FIG. 11, the identification system according to a second embodiment will be described. In the above-described first embodiment, the record in which the chip ID recorded in advance on the IC chip CH of the sleeve SV and the card ID are associated with each other is recorded in the association data D2, and the card ID corresponding to the chip ID detected through the second reader 5 of the game board 4 is determined based on the association data D2. In the second embodiment, the IC chip CH is utilized as a storage medium capable of writing and reading information, and the card ID is written in the IC chip C as the identification information to be held in the IC chip CH, thereby directly associating the identification result of the card C based on the image with the identification information to be held in the IC chip CH. Incidentally, in an identification system 1A of FIG. 9, portions common to the identification system 1 of FIG. 4 are denoted by the same reference numerals, and different portions will be mainly described below.

Figure 9:
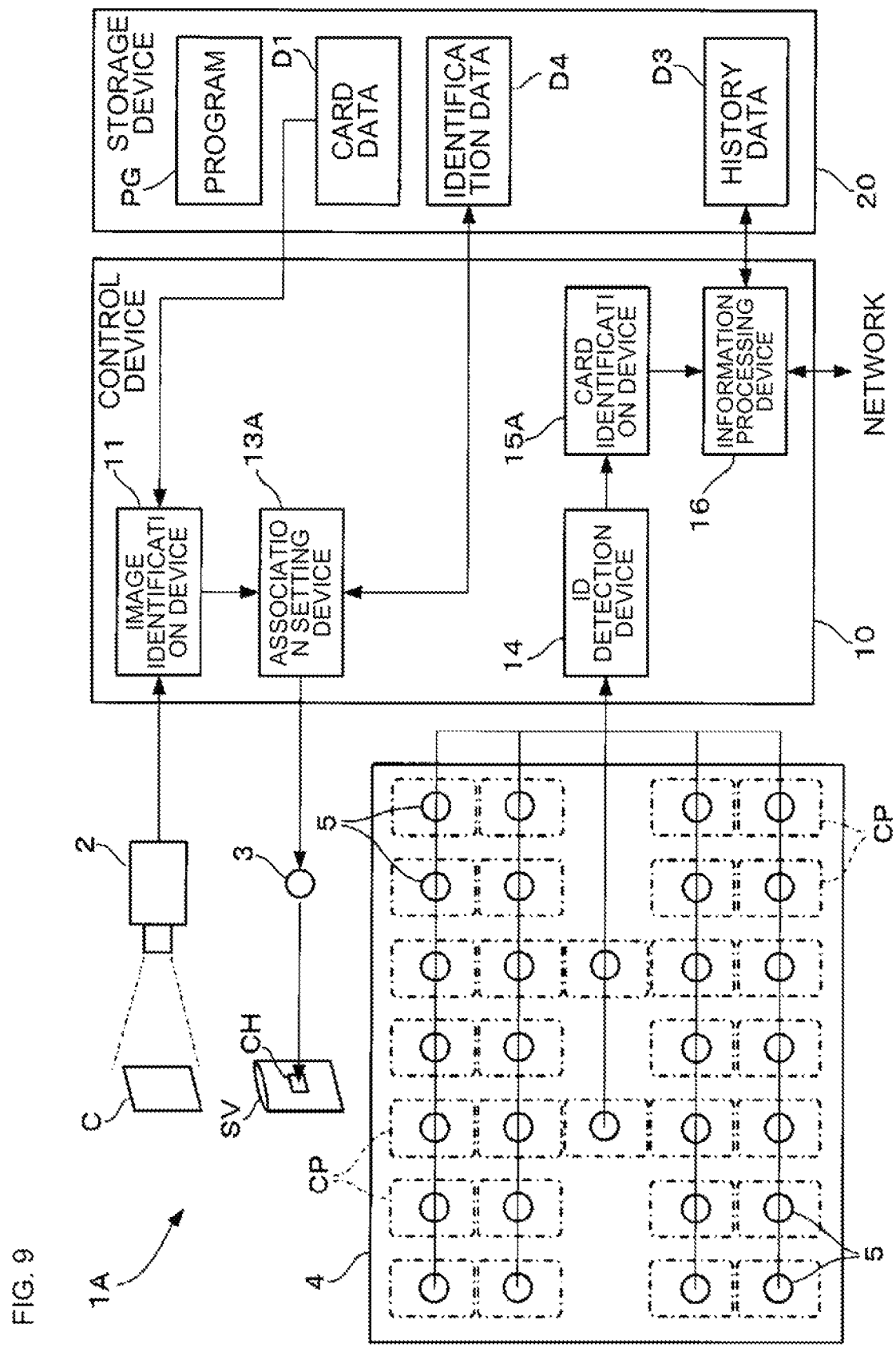
FIG. 9 shows one example of an overall configuration of a game medium identification system according to a second embodiment.

In the identification system 1A of FIG. 9, the IC chip CH of the sleeve SV is configured as an example of a storage medium capable of writing and reading information. As a device that corresponds to the IC chip CH, a writer 3A capable of writing information to the IC chip CH is provided instead of the first reader 3 of FIG. 4. The writer 3A may be a reader/writer capable of both writing and reading information. The control device 10 includes an association setting device 13A in place of the association setting device 13 of FIG. 4 as a logical device realized by a combination of a hardware resource of the control device 10 and a computer program PG as a software resource. The association setting device 13A writes the ordinal information and the card ID identified by the image identification device 11 to the IC chip CH through the writer 3A while referring to the identification data D4 recorded in the storage device 20. The information written into the IC chip CH by the association setting device 13A may be information obtained by excluding the chip ID from the record shown in FIG. 6, for example. The identification data D4 is data in which the record written by the association setting device 13A is accumulated. The reason why the association setting device 13A refers to the identification data D4 is that the ordinal information may be changed in relation to the information already written to the 1C chip CH of the other sleeve SV.

The control device 10 also includes an ID detection device 14A and a card identification device 15A as further logical devices. The ID detection device 14A detects the identification information of the sleeve SV combined with the card C placed in the game field GF and the position of the card C on the basis of the detection status of the identification information by the second reader(s) 5 of the game board 4, which is similar to the ID detection device 14 of FIG. 4. Incidentally, the information detected by the ID detection device 14A is the card ID written to the IC chip CH by the association setting device 13A and the ordinal information instead of the chip ID in the example of FIG. 4. Similar to the card identification section 15 of FIG. 4, the card identification section 15A identifies the card ID of the card C based on the detection result of the ID detection section 14A, and outputs the obtained card ID to the information processing section 16 in association with the detection position of the card ID. In this case, it is not necessary to identify the card ID using the chip ID as a clue, and therefore, the association data D2 shown in FIG. 4 is omitted.

Figure 10:
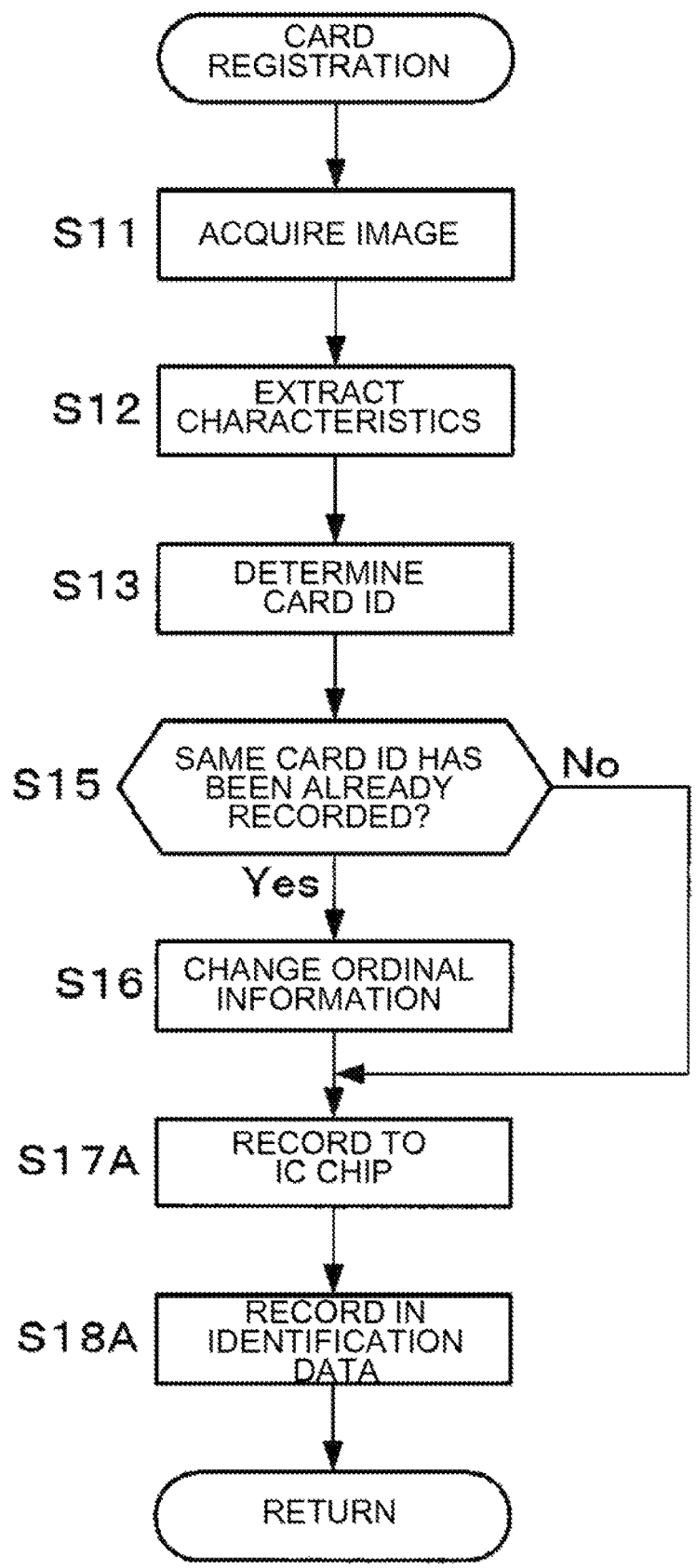
FIG. 10 is a flowchart illustrating one example of a procedure of a card registration process performed by a control device of FIG. 9.
Figure 11:
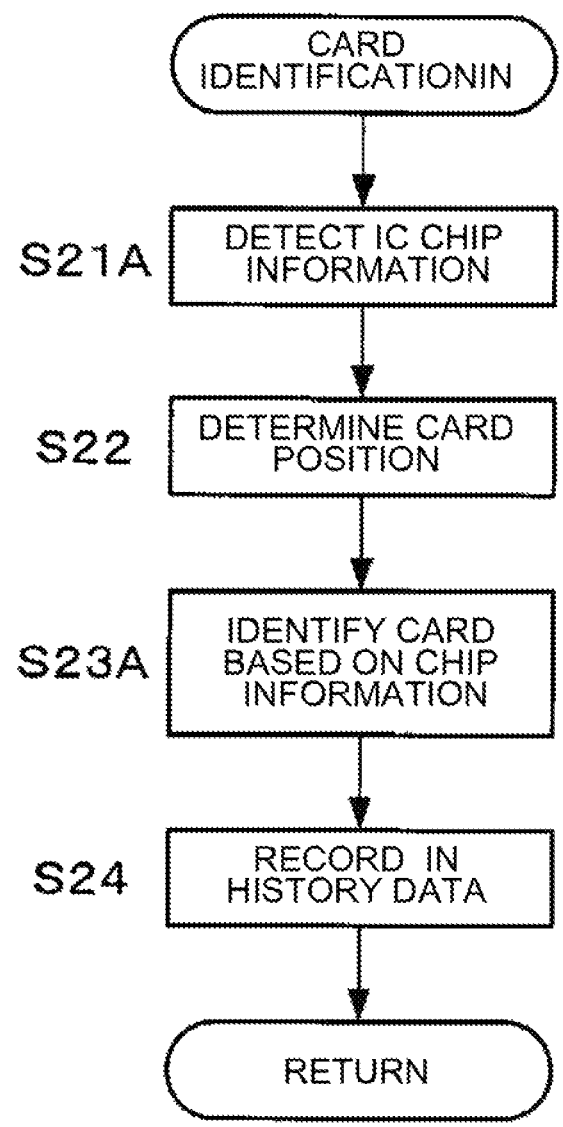
FIG. 11 is a flowchart illustrating one example of a procedure of a card identification process performed by the control device of FIG. 9.

FIG. 10 and FIG. 11 show examples of the processing for card registration in the control device 10 of the identification system 1A of FIG. 9 and the processing for card identification in association with FIG. 7 and FIG. 8. Incidentally, in FIG. 10 and FIG. 11, the same reference numerals are given to parts common to FIG. 7 and FIG. 8, and the following will be mainly described with reference to differences. In the processing for card registration of FIG. 10, the image identification device 11 first sequentially executes the processing of Step S11 to Step S13 in the same manner as the card registration processing of FIG. 7. Step S14 of FIG. 7 is omitted, and after the processing of Step S13, the association setting device 13A determines whether a record including the same card ID as the card ID provided from the image identification device 11 is already recorded in the identification data D4 (Step S15A). This processing is processing of determining whether or not the same card ID has already been written to the IC chip CH of another sleeve SV. If the determination of Step S15A is affirmative, the association setting device 13A changes the ordinal information in Step S16, and if the determination is negative, Step S16 is skipped. Thereafter, the association setting device 13A records the information to the IC chip CH (Step S17A). This processing controls the writer 3A such that the card ID determined in Step S13 is written to the IC chip CH of the sleeve SV together with the ordinal information (the value changed in Step S16 or an initial value). Subsequently, the association setting device 13A records the information, which is written to the IC chip CH this time, in the identification data D4 (Step S18A). Thus, the processing of FIG. 10 is completed.

The card identification processing of FIG. 11 is processing that is repeatedly executed at an appropriate cycle during the play of the game in the same manner as the card identification processing of FIG. 8. In this processing, the ID detection device 14A first acquires the detection status of the information of the IC chip CH by the reader 5 provided on the game board 4 (Step S21A), and determines the position where the card C is placed based on the detection result (Step S22). Subsequently, the card identification device 15A identifies the card ID of the card C combined with the sleeve SV based on the information recorded in the IC chip CH, and provides the obtained card ID and the identification result of the position of the card C to the information processing device 16 (Step S23A). The information processing device 16 generates card location information indicating the position and type of the card C on the game field GF at the execution time of the processing of FIG. 11 according to the provided identification result, and records the card location information in the history data D3 (Step S24).

In the above-described identification system 1A, according to the processing of FIG. 10, information such as the card ID for identifying the card C is recorded in the IC chip CH of the sleeve SV combined with the card C, and during the play of the game, the card ID and the position of the card C recorded in the IC chip CH are identified by the processing of FIG. 11, and the identification result is recorded in the history data D3. Therefore, it is possible to stably identify the card C without being affected by the environment in which the game is played. It is not necessary to record the identification information such as a bar code and an IC chip on the card C itself, and it is possible to identify an old card C to which the card identification technology is not yet applied. Since it is not necessary to affix an information medium such as an IC chip to the card C, it is possible to eliminate various inconveniences such as securing a space for affixing, deterioration of the appearance of the card C due to the affixing, and time and effort of affixing.

In the embodiments shown in FIG. 9 to FIG. 11, the image identification device 11 of the control device 10 functions as an example of the medium image identification device by executing the processing of Step S11 to Step S13 in FIG. 10, the association setting device 13A functions as an example of the association setting device by executing the processing of Step S15 to Step S17A in FIG. 10, the ID detection device 14A of the control device 10 executes the processing of Step S21A and Step S22 in FIG. 11, and the card identification device 15A functions as an example of the medium identification device by executing the processing of Step S23A in FIG. 11.

Incidentally, the card C used in the game is captured by the camera 2 to identify the card IC in each of the above-described first and second embodiments, but the appearance may be damaged so that it is not suitable for image identification, or a dirty card C may be used in the game. If such a card C is included in the deck DC, following exceptional processing may be performed: the operator of the control device 10 or someone else identifies the card C and manually enters the corresponding card ID.

The present invention is not limited to each of the above-described embodiments, and may be implemented in those configurations which include various changes or modifications. For example, in each of the above-described embodiments, the card registration processing (FIG. 7 and FIG. 10) and the card identification processing (FIG. 8 and FIG. 11) are executed by the common control device 10, but as in an identification system 1B shown in FIG. 12, a control device 10A in charge of the card registration processing and a control device 10B in charge of the card identification processing may be provided separately. For example, the identification of the card C based on the image captured by the camera 2 and the association processing between the identification result of the card C and the identification information held in the IC chip CH of the sleeve SV can be performed by a predetermined personal computer or the like, and the identification of the card C based on the output signal of the reader 5 of the game board 4 can be performed by another personal computer.

Figure 12:
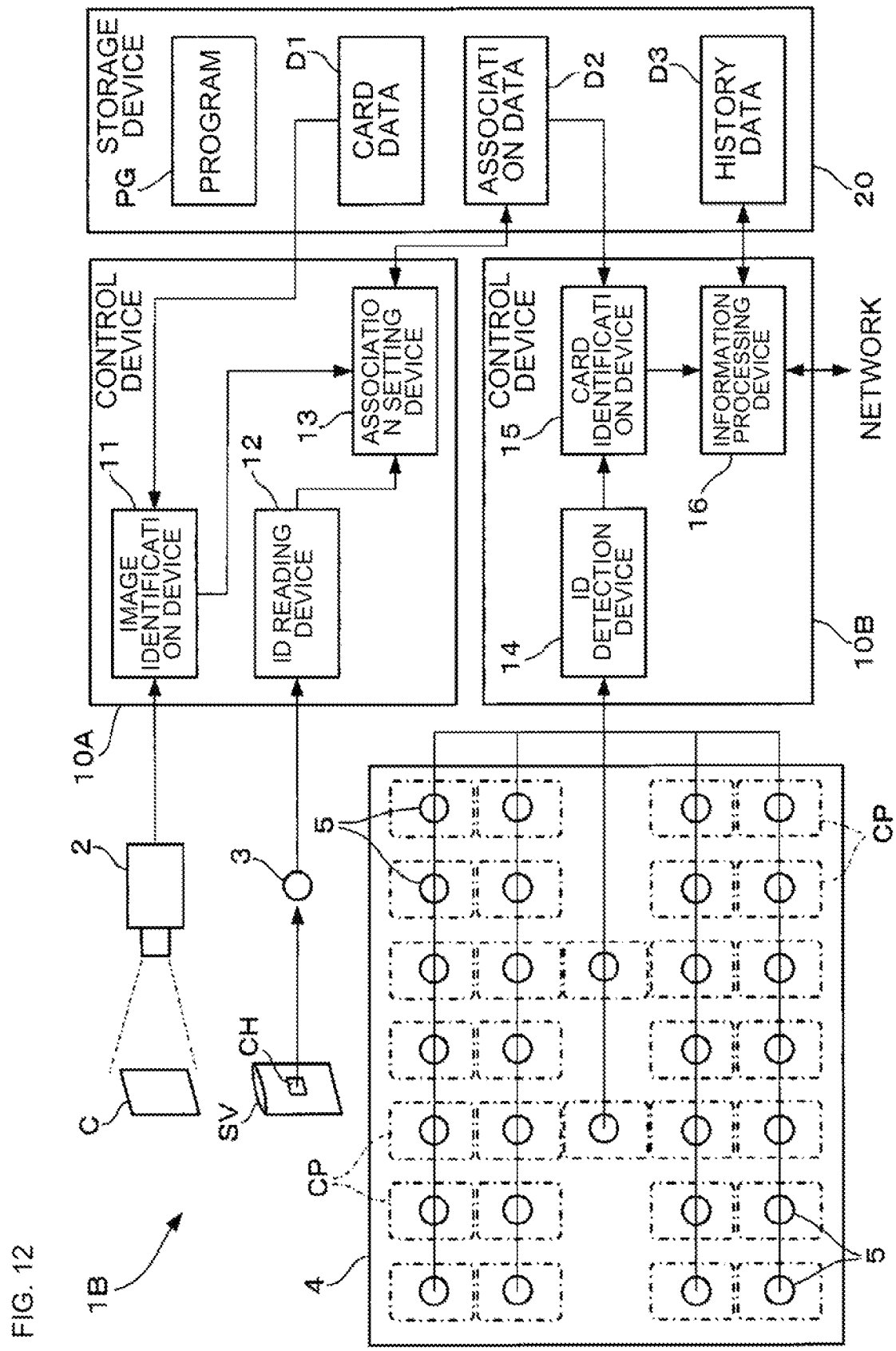
FIG. 12 is a diagram illustrating a modification of the game medium identification system.

In the example of FIG. 12, the storage device 20 may be an external storage connected to the control devices 10A and 10B via a network (LAN or WAN) or a database server. The embodiment illustrated in FIG. 12 is preferred when registration of the card and identification of the card are performed at a distance from each other. Furthermore, in the embodiment of FIG. 12, the respective readers 5 of a plurality of game boards 4 may be connected to the control device 10B, respectively. In this configuration, while the processing of associating the identification information of the cards in the decks used in the games with the identification information of the sleeves is comprehensively performed under a predetermined management system, the positions of the cards C in the games played on the respective game boards 4 can be distinguished from each other and recorded by the control device 10B for each of the game boards 4. Therefore, it is possible to easily cope with events such as an event having a large number of participating players. Incidentally, FIG. 12 shows a modification to the embodiment of FIG. 4, and a similar modification can be made to the embodiment of FIG. 9. Any of the control device 10 shown in FIG. 4 or FIG. 9, and the control devices 10A and 10B shown in FIG. 12 is not limited to a stand-alone computer device such as a personal computer or a computer device as a network terminal, and may be implemented by a server.

The image-capturing device is not limited to the camera 2 of the solid-state image pickup device type, and any suitable device may be used, such as an image scanner or other image-capturing devices, as long as it can acquire an image sufficient to extract the appearance elements of the game medium in a state capable of identifying each of the game media. The information medium to be provided in the additional thing such as the sleeve SV is not limited to the IC chip, and any suitable thing may be used as long as it can hold the identification information that can be used for identification of the game medium. For example, a medium, such as bar code or a two-dimensional code, which holds the identification information in an optically readable manner may be provided on the additional thing as an information medium. As long as it is provided on the additional thing, the information medium may be affixed to the additional thing in the form of, for example, a seal. For example, a seal having an RFID tag thereon or the like may be affixed to the sleeve SV to which the IC chip CH is not mounted. In this configuration, as described above, if one surface of the sleeve SV is transparent and the other surface is opaque, a seal is affixed onto the inside of the opaque surface such that a decrease in visibility of the card C is prevented and even if there is an error in the seal affixing position, it is possible to eliminate the possibility that the card C is identified from the back surface of the card using the error in the seal affixing position as a clue.

The game medium is not limited to a card shape, and may be a game medium having a three-dimensional shape such as a piece (chessman) or a figure. Also, the additional thing is not limited to the sleeve, and any suitable additional thing having an appropriate shape and function may be used as the additional thing to a subject having the information medium thereon as long as it is used in the game in combination with the game medium. For example, an additional thing having an appropriate shape and function, such as a cover-shaped thing fitted over one surface of a card-shaped game medium or a stand-shaped thing detachably attached to a part of the game medium, may be utilized. Incidentally, if the game medium has an area that is not visually recognized by the player during the play of the game or an area in which visibility by the player does not pose a problem during the play of the game, and an information medium such as an IC chip is directly attached to such area and used for identifying the game medium, there is no possibility that the information medium affects the visibility of the game medium. For example, if a three-dimensional shaped piece, figure or the like is used as a game medium, it is assumed that the game medium is attached or mounted so as to be hidden at a position such as the back of the game medium or the bottom of the game medium. In such a case, as a modified example of the above-described embodiment(s), it is also possible to directly mount the information medium on the game medium such that the identification information of the information medium is associated with the identification information of the game medium to identify the game medium.

The information reading device for reading the identification information from the information medium of the additional thing or the information detection device for detecting the identification information held in the information medium of the additional thing is not limited to the above-described readers 3 and 5, and may be changed as appropriate according to the shape and function of the additional thing or how the identification information is recorded in the information medium provided in or on the additional thing. For example, if the identification information is recorded as a bar code or a two-dimensional code, a bar code reader may be used to scan the bar code or the two-dimensional code.

In the above-described embodiments, it is assumed that a plurality of cards C having the same card ID can be included in the single deck DC, and the ordinal information is added to the record of the association data D2 or the identification data D4 in association with the card ID in order to identify the cards C from each other, but the ordinal information may be omitted when such identification is not necessary. In this case, for example, in the embodiment of FIG. 4, the chip ID of the sleeve SV is unique for each sleeve SV, and therefore it is not necessary to manage the association data D2 separately for each deck DC or for each player. That is, since a unique chip ID is detected from the game board 4 and a card ID associated with the chip ID is identified, it is possible to identify at least which card C is placed in which position at what timing during the game, and it goes without saying that the card C is identified after distinguishing the deck DC or the player PL. This feature is the same in the embodiment of FIG. 9.

The game, i.e., the subject to which the identification system of the present invention is applied, is not limited to a competition game which proceeds while the game media are appropriately placed in a plurality of places of the game field. For example, it is possible to apply the identification system of the present invention even to a game which proceeds while one or more predetermined number of cards as game media are sequentially placed in a predetermined field. As long as it is possible to detect the identification information from the additional thing of the game medium used in the game, it is not essential that the game proceeds while the game media are placed in the field. If the game does not matter how the game media are placed, the processing for detecting the positions of the game media may be omitted as a matter of course. The identification system of the present invention is applicable whether or not the game is played using a deck as an example of an aggregate of game media.

Various aspects of the present invention derived from each of the above-described embodiments and modifications will be described below. Incidentally, in the following description, to facilitate understanding of each aspect of the present invention, corresponding components illustrated in the accompanying drawings are additionally mentioned in parentheses, but this does not intend that the present invention is limited to the illustrated embodiments.

A game medium identification system (1;1A;1B) according to one aspect of the present invention is a game medium identification system applied to a game in which each of a plurality of physical game media (C), that includes an appearance element characterizing appearance, is used in combination with a predetermined additional thing (SV) for each game medium, and distinguishing and identifying the plurality of game media from each other, and the game medium identification system comprising: an information medium (CH) provided on the additional thing and capable of holding predetermined identification information; a medium image identification device (11, S11 to S13) identifying the game medium based on an image of the game medium captured by a predetermined image-capturing device (2); an association setting device (12, 13, S14 to S17; 13A, S15 to S17A) associating an identification result by the medium image identification device with an identification information of the information medium in accordance with correspondence relationship between one game medium and the additional thing to be used in the game in combination with the one game medium; and a medium identification device (15, S23; 15A, S23A) detecting the identification information from the information medium of the additional thing which is combined with the game medium being used in the game through a predetermined information detection device (5) and identifying the game medium based on the obtained identification information and association set by the association setting device.

A non-transitory computer readable recording medium according to another aspect of the present invention has a computer program for a game medium identification system that is a computer program (PG) for use with a game medium identification system (1; 1A; 1B) applied to a game in which each of a plurality of physical game media (C), that includes an appearance element characterizing appearance, is used in combination with a predetermined additional thing (SV) for each game medium, and distinguishing and identifying the plurality of game media from each other, the computer program is configured to cause a computer (10; 10A, 10B) of the game medium identification system to function as: a medium image identification device (11, S11 to S13) identifying the game medium based on an image of the game medium captured by a predetermined image-capturing device (2); an association setting device (12, 13, S14 to S17; 13A, S15 to S17A) associating an identification result by the medium image identification device with an identification information held in an information medium (CH) provided on the additional thing in accordance with correspondence relationship between one game medium and the additional thing to be used in the game in combination with the one game medium; and a medium identification device (15, S23; 15A, S23A) detecting the identification information from the information medium of the additional thing which is combined with the game medium being used in the game through a predetermined information detection device (5) and identifying the game medium based on the obtained identification information and association set by the association setting device.

A control method according to still another aspect of the present invention is a control method for use with a game medium identification system (1; 1A; B) applied to a game in which each of a plurality of physical game media (C), that includes an appearance element characterizing appearance, is used in combination with a predetermined additional thing (SV) for each game medium, and distinguishing and identifying the plurality of game media from each other, and the control method comprising: identifying (S11 to S13) the game medium based on an image of the game medium captured by a predetermined image-capturing device (2); setting (S14 to S17; S15 to S17A) association between an identification result of the game medium and identification information held in an information medium (CH) provided on the additional thing in accordance with correspondence relationship between one game medium and the additional thing to be used in the game in combination with the one game medium; detecting the identification information from the information medium of the additional thing which is combined with the game medium being used in the game through a predetermined information detection device; and identifying (S23; S23A) the game medium based on the obtained identification information and the set association.

According to the above-described aspects, while the game medium is identified based on the image of the game medium, the information medium is provided on the additional thing to be used in the game in combination with the game medium, the association is set between the identification information of the information medium and the identification result of the game medium. Further, when the game medium is used in the game, the identification information held in the information medium of the additional thing with respect to the game medium is detected. Since the association is set between the identification information of the information medium and the identification result of the game medium, it is possible to identify the game medium from the identification information of the information medium.

Incidentally, the computer program according to the aspect of the present invention may be provided in a state of being stored in a storage medium. If the storage medium is used and the computer program according to the present invention is installed and executed in a computer, for example, it is possible to realize the system of the present invention using the computer. The storage medium in which the computer program is stored may be a non-temporary storage medium such as a CDROM.

In the above-described aspects, it may be that an individual identification information (e.g., a chip ID) unique for each of the information media is recorded in the information medium as the identification information, the association setting device records association information (e.g., a record in FIG. 5) in which the individual identification information read by a predetermined information reading device (3) from the information medium is associated with the identification result by the medium image identification device, and the medium identification device identifies the game medium based on the individual identification information detected from the information medium through the information detection device and the association information.

In the above-described aspects, it may be that the information medium is provided as a storage medium capable of writing and reading information, and the association setting device associates the identification result by the medium image identification device with the identification information of the information medium by writing the medium identification information (e.g., the card ID) corresponding to the identification result by the image identification device into the information medium as the identification information through a predetermined information writing device (3A).

In the above-described aspects, it may be that the information detection device is provided in a field (e.g., the game field GF) where the game medium is used in the game so that the identification information can be detected from the information medium of the game medium placed in the field, and the medium identification device identifies the game medium based on the identification information detected by the information detection device and the association set by the association setting device.

It may be that, in the field, a plurality of detection devices (5) that respectively function as the information detection device are arranged, and the medium identification device also identifies the position where the game medium is placed based on detection status of the identification information in each of the plurality of detection devices.

It may be that the information detection device is provided on a placed object (4) which has portability and can be carried in and out with respect to the field.

In the above-described aspects, it may be that, when a plurality of game media include a plurality of appearance common media (e.g., a plurality of cards C having a common card ID) in which the appearance elements are common, the association setting device associates the identification result by the medium image identification device with the identification information of the information medium such that the appearance common media can be distinguished from each other.

It may be that the game medium is card-shaped and the additional thing is provided such that the additional thing is combined on at least one surface of the game medium.

It may be that the additional thing is in the form of a sleeve into which the game medium can be inserted. In the game using the card-shaped game media, a sleeve-shaped additional thing is often used to prevent damage or the like due to scratching of the game medium.

It may be that the appearance element is provided on one surface of the game medium, and appearance of another surface is shared between a plurality of game media so that the plurality of game media is indistinguishable. In the card-shaped game medium, an appearance characterizing the game medium is given to one of the two surfaces, and the other surface is often given a common appearance to disenable the distinction when the game medium is turned over. In that case, even if an attempt is made to identify the game medium based on the image during the play of the game, it is impossible to identify the turned-over game medium.

What is claimed is:

1. A game medium identification system applied to a game in which each of a plurality of physical game media, that includes an appearance element characterizing appearance, is used in combination with a predetermined additional thing for each game medium, and distinguishing and identifying the plurality of game media from each other, the game medium identification system comprising:
    an information medium provided on the additional thing and capable of holding predetermined identification information;
    a computer analyzing an image of the game medium captured by a predetermined image-capturing device;
    the computer identifying a type of the game medium based on the appearance element included in the image;
    the computer associating an identification result by the computer with an identification information of the information medium in accordance with correspondence relationship between one game medium and the additional thing to be used in the game in combination with the one game medium;
    the computer detecting the identification information from the information medium of the additional thing which is combined with the game medium being used in the game through a predetermined information detection device and identifying the game medium based on the obtained identification information and association set by the computer; and
    the computer recording association information in which the identification information is associated with the identification results so as to be capable of determining a relationship between the association information and a game medium group comprising a plurality of game media.

2. The game medium identification system according to claim 1, wherein an individual identification information unique for each of the information media is recorded in the information medium as the identification information,
    the computer records the association information to associate the individual identification information read by a predetermined information reading device from the information medium with the identification result by the computer, and
    the computer identifies the game medium based on the individual identification information detected from the information medium through the information detection device and the association information.

3. The game medium identification system according to claim 1, wherein the information medium is provided as a storage medium capable of writing and reading information, and
    the computer associates the identification result by the computer with the identification information of the information medium by writing the medium identification information corresponding to the identification result by the image identification device into the information medium as the identification information through a predetermined information writing device.

4. The game medium identification system according to claim 1, wherein the information detection device is provided in a field where the game medium is used in the game so that the identification information can be detected from the information medium of the game medium placed in the field, and the computer identifies the game medium based on the identification information detected by the information detection device and the association set by the computer.

5. The game medium identification system according to claim 4, wherein, in the field, a plurality of detection devices that respectively function as the information detection device are arranged, and
the computer also identifies a position where the game medium is placed based on detection status of the identification information in each of the plurality of detection devices.

6. The game medium identification system according to claim 4, wherein the information detection device is provided on a placed object which has portability and can be carried in and out with respect to the field.

7. The game medium identification system according to claim 1, wherein, when a plurality of game media include a plurality of appearance common media in which the appearance elements are common, the computer associates the identification result by the computer with the identification information of the information medium such that the appearance common media can be distinguished from each other.

8. The game medium identification system according to claim 1, wherein the game medium is card-shaped and the additional thing is provided such that the additional thing is combined on at least one surface of the game medium.

9. The game medium identification system according to claim 1, wherein the additional thing is in the form of a sleeve into which the game medium can be inserted.

10. The game medium identification system according to claim 8, wherein the appearance element is provided on one surface of the game medium, and appearance of another surface is shared between a plurality of game media so that the plurality of game media is indistinguishable.

11. A non-transitory computer readable recording medium which has a computer program for use with a game medium identification system applied to a game in which each of a plurality of physical game media, that includes an appearance element characterizing appearance, is used in combination with a predetermined additional thing for each game medium, and distinguishing and identifying the plurality of game media from each other, the computer program is configured to cause a computer to analyze an image of the game medium captured by a predetermined image-capturing device;
to identify a type of the game medium based on the appearance element included in the image;
to associate an identification result by the computer with an identification information held in an information medium provided on the additional thing in accordance with correspondence relationship between one game medium and the additional thing to be used in the game in combination with the one game medium;
to detect the identification information from the information medium of the additional thing which is combined with the game medium being used in the game through a predetermined information detection device and identifying the game medium based on the obtained identification information and association set by the computer; and
to record association information in which the identification information is associated with the identification result to as to be capable of determining a relationship between the association information and a game medium group comprising a plurality of game media.

12. A control method for use with a game medium identification system applied to a game in which each of a plurality of physical game media, that includes an appearance element characterizing appearance, is used in combination with a predetermined additional thing for each game medium, and distinguishing and identifying the plurality of game media from each other, the control method comprising:
analyzing an image of the game medium captured by a predetermined image-capturing device;
identifying a type of the game medium based on the appearance element included in the image;
setting association between an identification result of the game medium and identification information held in an information medium provided on the additional thing in accordance with correspondence relationship between one game medium and the additional thing to be used in the game in combination with the one game medium;
detecting the identification information from the information medium of the additional thing which is combined with the game medium being used in the game through a predetermined information detection device;
identifying the game medium based on the obtained identification information and the set association;
recording association information in which the identification information is associated with the identification result so as to be capable of determining a relationship between the association information and a game medium group comprising a plurality of game media.

* * * * *